Figure 1:
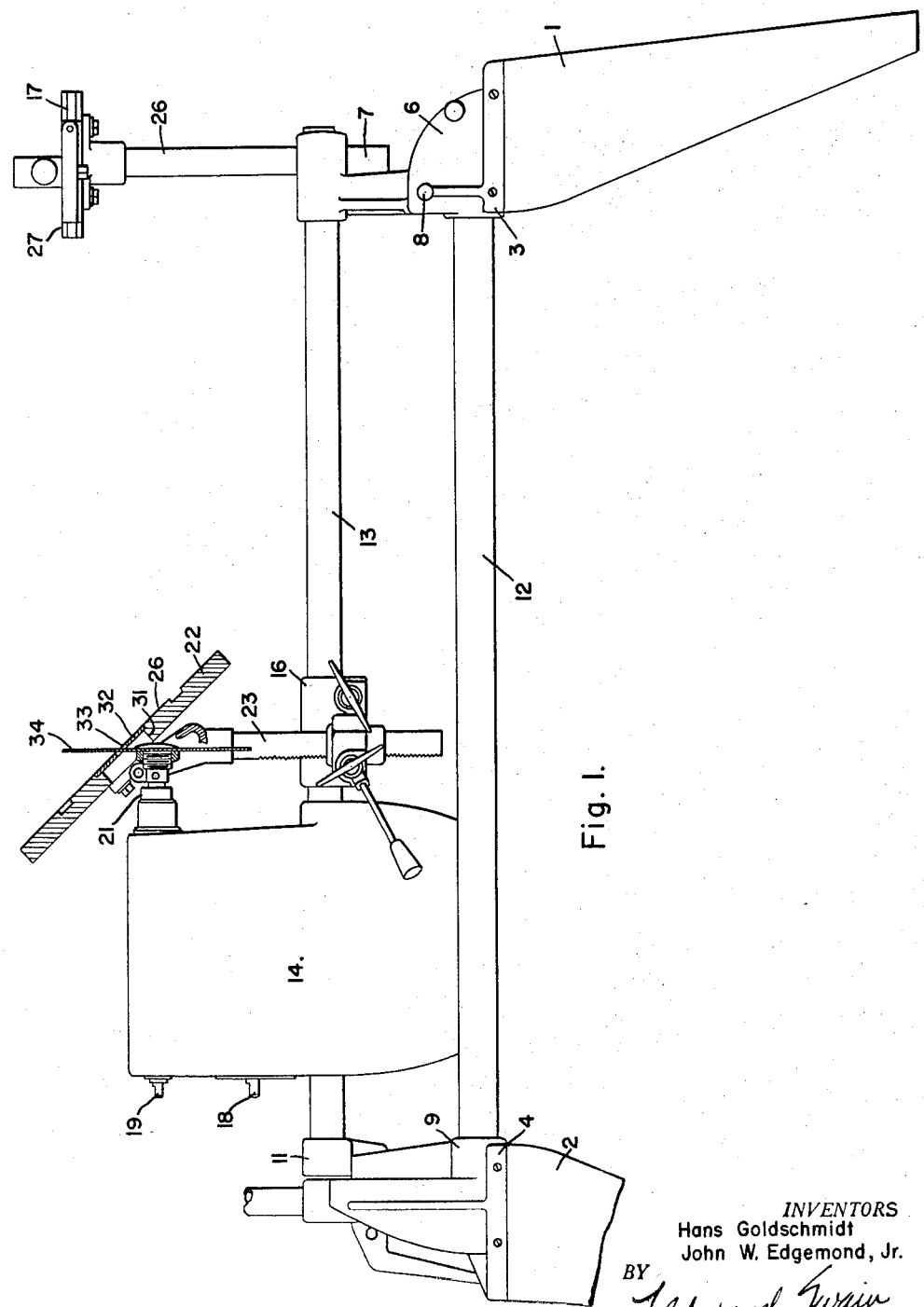

July 19, 1960  J. W. EDGEMOND, JR., ET AL  2,945,519
SAW ARBOR

Filed Aug. 30, 1957  2 Sheets-Sheet 1

Fig. I.

INVENTORS
Hans Goldschmidt
John W. Edgemond, Jr.
BY
*Fisher and Swain*
attorney

July 19, 1960    J. W. EDGEMOND, JR., ET AL    2,945,519
SAW ARBOR

Filed Aug. 30, 1957    2 Sheets-Sheet 2

*INVENTORS*
Hans Goldschmidt
John W. Edgemond, Jr.
BY
*Attorney*

# United States Patent Office 2,945,519
Patented July 19, 1960

2,945,519
SAW ARBOR

John W. Edgemond, Jr., Los Altos, and Hans Goldschmidt, Atherton, Calif., assignors, by mesne assignments, to Yuba Consolidated Industries, Inc., San Francisco, Calif., a corporation of Delaware Filed Aug. 30, 1957, Ser. No. 681,372

1 Claim. (Cl. 143—155)

This invention relates to and in general has for its object the provision of a novel type of saw arbor and this application is a continuation-in-part of our copending application, Serial No. 494,468, filed March 15, 1955, for a "Combination Power Tool," now Patent No. 2,927,612.

The objects of our above-identified invention are fully set forth therein and this divisional application relates to the saw arbor disclosed as being useful in conjunction with the combination power tool which we described therein.

In that application our saw arbor is disclosed in combination with our combination power tool, but, as is readily apparent from an analysis of the above-identified copending application, our saw arbor may be used in connection with any saw table and saw.

It is a particular object of this invention to provide, in combination with a saw, a saw arbor which eliminates the use of a nut adjacent the outer face of the saw whereby greater clearance between the table and the arbor may be obtained.

It is a further object of this invention to provide an arbor construction which replaces the conventional saw arbor construction which utilizes bulky parts on both sides of the saw blade and to substitute an arbor construction in which the parts on the outside of the blade are of the smallest possible size.

It is a further object of this invention to provide a saw arbor construction in which, should the assembly become loose during operation, the blade cannot be thrown from the arbor and injure an operator.

This invention possesses other advantageous features, some of which, together with the foregoing will be set forth at length in the following description with those forms of the invention which have been selected for illustration in the drawings accompanying and forming a part of the present application. It is to be understood that this invention is not limited to the specific forms shown in the drawings since the invention as set forth in the claim may be embodied in other forms.

Figure 2:
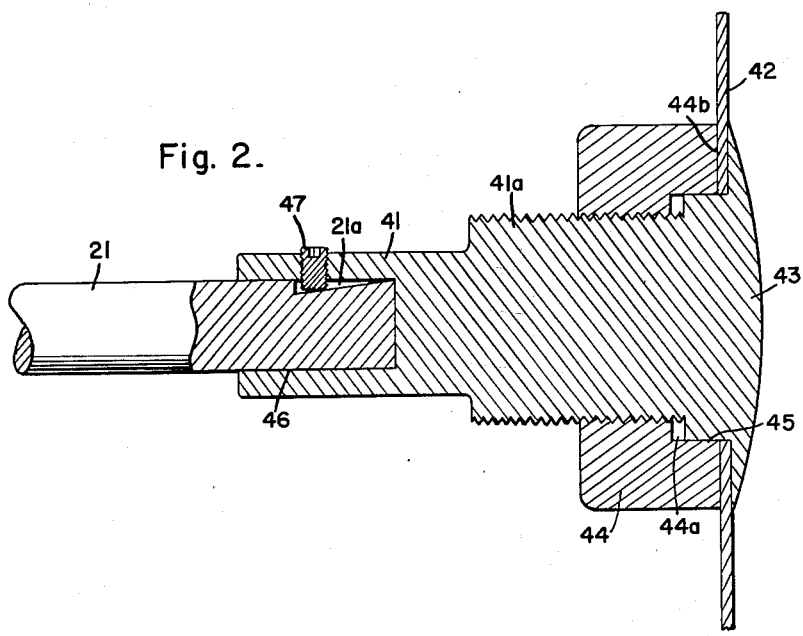
Figure 3:
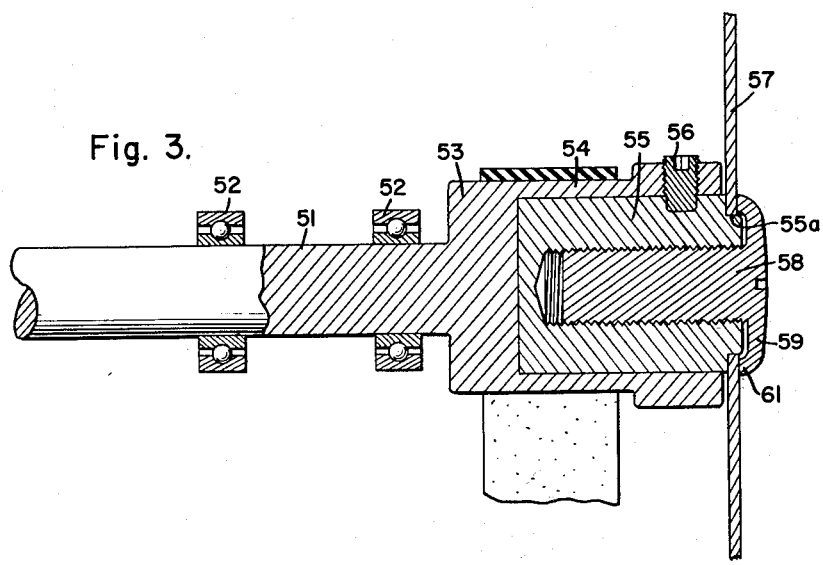

Referring to the drawings:

Figure 1 is a front side elevational view of a combination power tool showing our saw arbor mounted thereon, Figure 2 is an enlarged cross-sectional view of our saw arbor, and Figure 3 is an enlarged cross-sectional view of a modification of our saw arbor.

As is generally shown in Figure 1 our saw arbor has been shown mounted on a combination tool of the type disclosed in our copending application, Serial No. 494,468, filed March 15, 1955, for a "Combinaion Power Tool," of which the instant application is a continuation-in-part. The combination power tool disclosed therein includes a pair of opposed identical steel bench ends 1 and 2 which support a pair of bench base assemblies 3 and 4. Assemblies 3 and 4 differ in their construction; the bench base 3 consisting of portions 6 and 7 which are hingedly connected so that portion 7 may pivot about the point 8 and the bench base end 4 consisting of a pair of portions 9 and 11 which may be disconnected so that the portion 11 may be swung upwardly about point 8 and away from portion 9. The assemblies 3 and 4 accommodate two pairs of parallel transversely spaced longitudinally extending tubular ways 12 and 13. The pair of ways 13 accommodate a headstock assembly 14 and a table and tool rest carriage or mount 16. The portion 7 of the bench base casting assembly 3 supports an auxiliary table assembly 17 which may be raised and lowered with respect thereto.

The headstock 14 is adapted to be moved longitudinally along the ways 13 and generally comprises a suitable casting which supports an electric motor, not illustrated, which drives a plurality of driven shafts 18, 19 and 21 which are designed to accommodate a plurality of tools in the manner described in the aforementioned copending application.

The table and tool rest carriage and mounting illustrated generally at 16 is of rectangular form and is adapted to be slidably mounted on the ways 13. The carriage supports a table 22 which is mounted upon a pair of posts 23. The table 22 is conventional in shape and is provided with an elongated slot through which a saw blade or dado head may pass. The table assembly is supported by a pair of tubular members 25 and is movable vertically so that its upper surface 26 may be made coplanar with the upper surface 27 of the table 22.

Formed in the table 22 is a generally rectangular rabbeted opening 31 for the flush reception of a mating table insert 32 and provided in the table insert 32 is a generally rectangular saw slot 33 for the reception of a circular saw 34 mounted upon the spindle or driven shaft 21.

Although the saw can be attached to the spindle 21 by a conventional arbor when beveled cuts are being made, our arbor as illustrated in the drawings can be used to advantage to gain additional clearance between the outer end of the arbor and the bottom of the table. To this end the arbor shown in the drawing comprises a bolt 41 arranged to receive the hub of the saw 42 and which bolt is provided with a relatively shallow rounded head 43. Threaded over the bolt 41 is a nut 44 for attaching the saw to the bolt head 43 and formed in the end of the bolt is a bore 46 arranged to receive the end of the spindle 21. A set screw 47 is provided for locking the bolt to the spindle. As a result of this construction, the use of a nut adjacent the outer face of the saw had been avoided and greater clearance between the table and the arbor is obtained.

As is more particularly illustrated in Figure 2 the spindle 21 may be provided with a flattened portion 21a. The bolt is threaded at 41a and immediately adjacent the relatively shallow rounded head 43 there is an enlarged shoulder portion 45 whose diameter is approximately the same as the diameter of the hub of the saw 42. The nut 44 is cut away to provide an internal axial recess 44a which is adapted to cooperate with the shoulder portion 45. The face 44b is parallel with the inner face of the head 43 and when the nut 44 is tightened the saw is frictionally held between these faces. It is also apparent that in the event the nut 44 should become loosened that the blade 42 will not fly off the arbor but will be retained on the arbor by the bolt head 43.

In the modification illustrated in Figure 3 the driven shaft 51 is supported by bearings 52 and is provided with an enlarged hub 53 which is adapted to be engaged by a chain or belt to impart rotary motion thereto. The enlarged hub 53 is provided with a bore 54 to accommodate a saw blade supporting member 55. The member 55 is received within the bore and is retained therein by a set screw 56 which is threadedly engaged in one of the side walls of the member 53 and adapted to frictionally engage the member 55. The member 55 is provided with shoulder 55a which is of approximately the same diameter as the hub of the saw blade 57. The member 55 is threaded to receive a bolt 58 which is provided with a relatively shallow rounded head 59. The head 59 is provided with an internal axial recess to form an annular flange 61 which is adapted to engage the saw blade 57 and to hold the same on the shoulder 56. As the member 58 is turned into the member 55 it frictionally engages the blade 57 and causes the same to rotate with the member 55 and the shaft 51.

It is apparent that either of our saw arbor constructions will accommodate a saw blade and will expose only a relatively shallow rounded head 43 or 59. When our arbor is used, for example, on a saw of the radial arm type it is apparent that the relatively shallow rounded head 43 or 59 will not engage the workpiece when the saw is at sharply tilted angle and that a deeper cut can be taken with the same blade at the same angle.

We claim:

In a saw arbor construction of the type which is operatively connected to the free end of a driven shaft whose other end terminates in a source of power such as an electric motor, the free end of the shaft having a flat portion, an enlarged exteriorly threaded member, a centrally disposed bore at one end of said threaded member cooperating with said driven shaft and fitting over the free end of the same, a threaded hole in the wall of said bore, threaded means cooperating with said threaded hole in the wall of said bore and engaging said flat on said driven shaft to secure said driven shaft and said enlarged exteriorly threaded member in cooperative relationship, a shallow rounded head formed on that portion of said threaded member remote from said bore, an interiorly threaded nut member threaded on said exteriorly threaded member and adapted to be urged toward and away from said shallow rounded head, an enlarged shoulder provided on said threaded member adjacent said head, said threaded nut member being provided with an internal annular recess whose diameter is slightly larger than the diameter of said shoulder, a saw blade positioned on said shoulder between said head and said nut whereby when said nut is tightened said saw blade is firmly positioned on said shoulder between said nut and said shallow rounded head and, whereby when said nut is loosened and disengaged from said shoulder and from said enlarge exteriorly threaded member said saw blade may not be removed from said arbor and driven shaft assembly in a direction away from said shallow rounded head.

References Cited in the file of this patent

UNITED STATES PATENTS

| 787,532 | McCreery | Apr. 18, 1905 |
| 1,409,758 | Nichols | Mar. 14, 1922 |
| 2,646,090 | Kluck | July 21, 1953 |

FOREIGN PATENTS

| 938,875 | Germany | Feb. 9, 1956 |